United States Patent [19]
Cap et al.

[11] Patent Number: 5,949,164
[45] Date of Patent: Sep. 7, 1999

[54] DISK STORAGE DEVICE WITH ELECTRIC MOTOR WITH AXIALLY DEEP FLANGE

[75] Inventors: Heinrich Cap; Dieter Elsaesser, both of St. Georgen; Ulrich Koletzki, Tennenbronn; Georg Papst, St. Georgen, all of Germany

[73] Assignee: Papst Licensing GmbH, Germany

[21] Appl. No.: 08/915,382

[22] Filed: Aug. 20, 1997

Related U.S. Application Data

[63] Continuation of application No. 08/741,113, Oct. 30, 1996, abandoned, which is a continuation of application No. 08/477,517, Jun. 7, 1995, abandoned, which is a continuation of application No. 08/201,709, Feb. 25, 1994, Pat. No. 5,552,650, which is a continuation of application No. 07/529,573, May 29, 1990, abandoned, which is a continuation-in-part of application No. 07/364,036, Jun. 9, 1989, abandoned.

[30] Foreign Application Priority Data

Jun. 9, 1988 [DE] Germany .......................... 88 07 530 U
Jun. 9, 1989 [GB] United Kingdom .................... 8913364

[51] Int. Cl.$^6$ ...................................... H02K 7/00
[52] U.S. Cl. .......................... 310/67 R; 310/90; 310/156; 277/57; 360/99.08
[58] Field of Search ...................................... 310/67 R, 90, 310/56, 156, 45, 89, 179, 180, 88, DIG. 6, 42, 257; 277/57, 56, 53, 55; 360/99.08, 99.12; 389/480

[56] References Cited

U.S. PATENT DOCUMENTS

| | | | |
|---|---|---|---|
| 3,629,277 | 7/1972 | Dohman | 310/90 |
| 3,922,590 | 11/1975 | Warren et al. | 318/138 |
| 4,117,359 | 9/1978 | Wehde | 310/67 R |

(List continued on next page.)

FOREIGN PATENT DOCUMENTS

| | | | |
|---|---|---|---|
| 0210-835A2 | 2/1987 | European Pat. Off. | H02K 29/06 |
| 0291295 | 11/1988 | European Pat. Off. | H02K 5/136 |
| 0291295A2 | 11/1988 | European Pat. Off. | H02K 5/136 |
| 2319579 | 10/1973 | Germany | H02K 21/22 |
| 2225442 | 12/1973 | Germany | H02K 29/02 |
| 2325473 | 12/1974 | Germany | H01K 17/10 |
| 2421379 | 11/1975 | Germany | B65G 39/09 |
| 2645677 | 4/1977 | Germany | H01K 7/14 |
| 2645677A1 | 4/1977 | Germany | H02K 7/14 |
| 2346380 | 1/1978 | Germany | H02K 29/02 |
| 3135385 | 3/1983 | Germany | G11B 19/20 |
| 3135385A1 | 3/1983 | Germany | G11B 19/20 |
| 3326543 | 1/1985 | Germany | H02K 5/16 |
| 3326543A1 | 1/1985 | Germany | H02K 5/17 |
| 227012A1 | 9/1985 | Germany | H02K 29/00 |
| 2314259 | 5/1987 | Germany | H02K 29/06 |
| 53-55106 | 5/1978 | Japan | G11B 23/50 |
| 62-64247 | 3/1987 | Japan | H02K 29/00 |
| 63-859 | 1/1988 | Japan | G11B 19/20 |
| 1262376 | 2/1972 | United Kingdom | H02K 17/02 |
| 2162376 | 1/1986 | United Kingdom | H02K 5/16 |
| 2218857 | 11/1989 | United Kingdom | G11B 25/04 |
| WO-85/03593 | 8/1985 | WIPO | B11B 11/038 |

OTHER PUBLICATIONS

E.W. Ernst, "Cold–Working Processes," Materials and Processes, 1959, p. 769, Modern Asia Edition, Japan.

*Primary Examiner*—Thomas M. Dougherty
*Attorney, Agent, or Firm*—Finnegan, Henderson, Farabow, Garrett & Dunner, L.L.P.

[57] ABSTRACT

A compact disk storage device having outer-rotor electric motor for directly driving a disk for recording and reproducing information has an axially deep, tank-form flange and a stationary shaft, upon which the mounting annulus of the flange and the ball bearings of the hub are axially displaced. The hub includes a cover disk for sealing an extremity of the ball bearings and an inverted cup shape rotor providing magnetic shielding. The flange includes a mounting rim substantially aligned with the back surface of the cup-shape rotor. The facing cup-like and tank-form shapes readily enable labyrinth seals and substantial and abutting axial extents along the axis of the stationary shaft.

16 Claims, 1 Drawing Sheet

U.S. PATENT DOCUMENTS

| | | | |
|---|---|---|---|
| 4,554,473 | 11/1985 | Müller | 310/67 R |
| 4,599,664 | 7/1986 | Schuh | 360/97 |
| 4,658,312 | 4/1987 | Elsaesser et al. | 360/97 |
| 4,698,542 | 10/1987 | Mueller | 310/67 R |
| 4,701,653 | 10/1987 | Merkle et al. | 310/152 |
| 4,760,298 | 7/1988 | Kitahara et al. | 310/67 R |
| 4,779,165 | 10/1988 | Elsaesser et al. | 360/97 |
| 4,814,651 | 3/1989 | Elris et al. | 310/88 |
| 4,837,474 | 6/1989 | Petersen et al. | 310/254 |
| 4,843,500 | 6/1989 | Elsaesser et al. | 360/97.07 |
| 4,867,581 | 9/1989 | Schmidt et al. | 310/42 |
| 4,894,738 | 1/1990 | Elsaesser et al. | 360/97.1 |
| 4,900,958 | 2/1990 | Kitahara et al. | 310/67 R |
| 4,965,476 | 10/1990 | Lin | 310/51 |
| 4,996,613 | 2/1991 | Hishida | 310/90 |
| 5,128,819 | 7/1992 | Elsaesser et al. | 360/99.08 |
| 5,157,295 | 10/1992 | Stefansky et al. | 310/90 |
| 5,216,557 | 6/1993 | Elsaesser et al. | 360/99.08 |
| 5,400,197 | 3/1995 | Jabbari et al. | 360/99.08 |
| 5,422,769 | 6/1995 | Elsaesser et al. | 360/99.08 |
| 5,424,887 | 6/1995 | Schuh | 360/97.03 |

DISK STORAGE DEVICE WITH ELECTRIC MOTOR WITH AXIALLY DEEP FLANGE

This application is a continuation of application Ser. No. 08/741,113, filed Oct. 30, 1996, now abandoned, which is a continuation of application Ser. No. 08/477,517, filed Jun. 7, 1995, now abandoned, which is a continuation of application Ser. No. 08/201,709, filed Feb. 25, 1994 now U.S. Pat. No. 5,552,650, issued Sep. 3, 1996, which is a continuation of application Ser. No. 07/529,573, filed May 29, 1990, now abandoned which is a continuation-in-part of application Ser. No. 07/364,036, filed Jun. 9, 1989, now abandoned.

BACKGROUND OF THE INVENTION

Field of the Invention

This invention relates to disk storage devices using electric motors, especially those for directly driving rotary loads requiring "clean room" conditions, such as do many information storage disks.

In the market for information storage disks, there is a continuing demand for compactness. Earlier, this demand was satisfied by external rotor motors, which could be axially relatively short. Now that demand is also directed toward an ever-diminishing diameter of information storage disks and of the apparatuses which hold them. At the same time, the motor must still supply adequate torque, have a certain minimum angular momentum and smooth-running operation, and inhibit the passage of dirt particles from its bearings and torque-generating regions toward a "clean room" region, all without increasing its overall axial dimension.

SUMMARY OF THE INVENTION

According to the invention, a disk storage device having a drive motor for directly driving a disk for recording and reproducing information, the motor including a hub on which the disk can be driven, comprises an axially-deepened, tank-form flange, a stationary shaft fixedly mounted centrally in the deepened flange and having an end beyond the flange, two separated ball bearings mounted on the shaft beyond the flange, one of the ball bearings being proximate to the flange; and a hub mounted on said ball bearings for relative motion with respect to said shaft and including a rotor cup shape of low-remanence magnetic circuit material facing into the axially-deepened tank form of the flange, the motor further including and the rotor cup shape further supporting an outer rotor, the motor further including an the axially-deepened flange further supporting a stator inserted within the limits of the outer rotor.

It is feature of the invention, that the axially-deepened tank form of the flange facilitates an offset mounting rim thereon that can be aligned essentially in the back plane of the rotor cup shape, thereby avoiding axial lengthening of the motor; while the offset mounting rim and rotor cup shape together provide an approximation of an outer labyrinth seal for dust particles from the motor and provide superior magnetic shielding.

It is a further feature of the invention that the use of a stationary shaft allows axial separation of the ball bearings and the central annulus of the flange, rather than the prior art radial separation of them, thereby yielding a corresponding reduction in the diameter of the motor. Still other features of the invention are related to the use of a stationary shaft, such as the inner seals with respect to the bearings.

BRIEF DESCRIPTION OF THE DRAWING

Further features and advantages of the invention may be acquired from the following detailed description, taken together with the drawing, in which the sole FIGURE illustrates a preferred embodiment of the invention An outer-rotor cup-like form 33, deep-drawn out of soft iron sheet, surrounds a ring-type permanent magnet 21, and for that serves as the magnetic return path in a simultaneously-provided outer rotor housing, which has its cup-like opening facing toward the flange 8 shown below it, into which it axially projects; that is, the flange 8 is axially offset and has a high-raised rim 81, which lies at about the same height as the extreme outside surface 32 of the rotor cup 33. The central stationary shaft 5 is in the center of this deep-lying flange floor, so-to-speak in the flange tank, firmly inserted. The shaft 5 bears at the same time, in the essential manner of the electric motor 20, an axially separated arrangement of the ball bearings 6 and 7, the outer races of which are inserted in the hub component 11, which rotates with those around the stationary shaft 5. This hub component 11 is a one-piece turntable part, for example out of aluminum, that has a first shoulder 35 offset toward the flange 8, and, in the region of this lower shoulder 35, is bonded on its axial underside to the surface 32 of the iron rotor cup 33, for example, by sputtering or gluing circumferentially.

The base surface of that rotor cup is strongly drawn radially inward so that that base surface yields at the same time a good magnetic shield for the disk chamber, the clean room referred to above, where the magnetic information disks or disk 84 and the reading and recording heads are provided.

Figure 1:
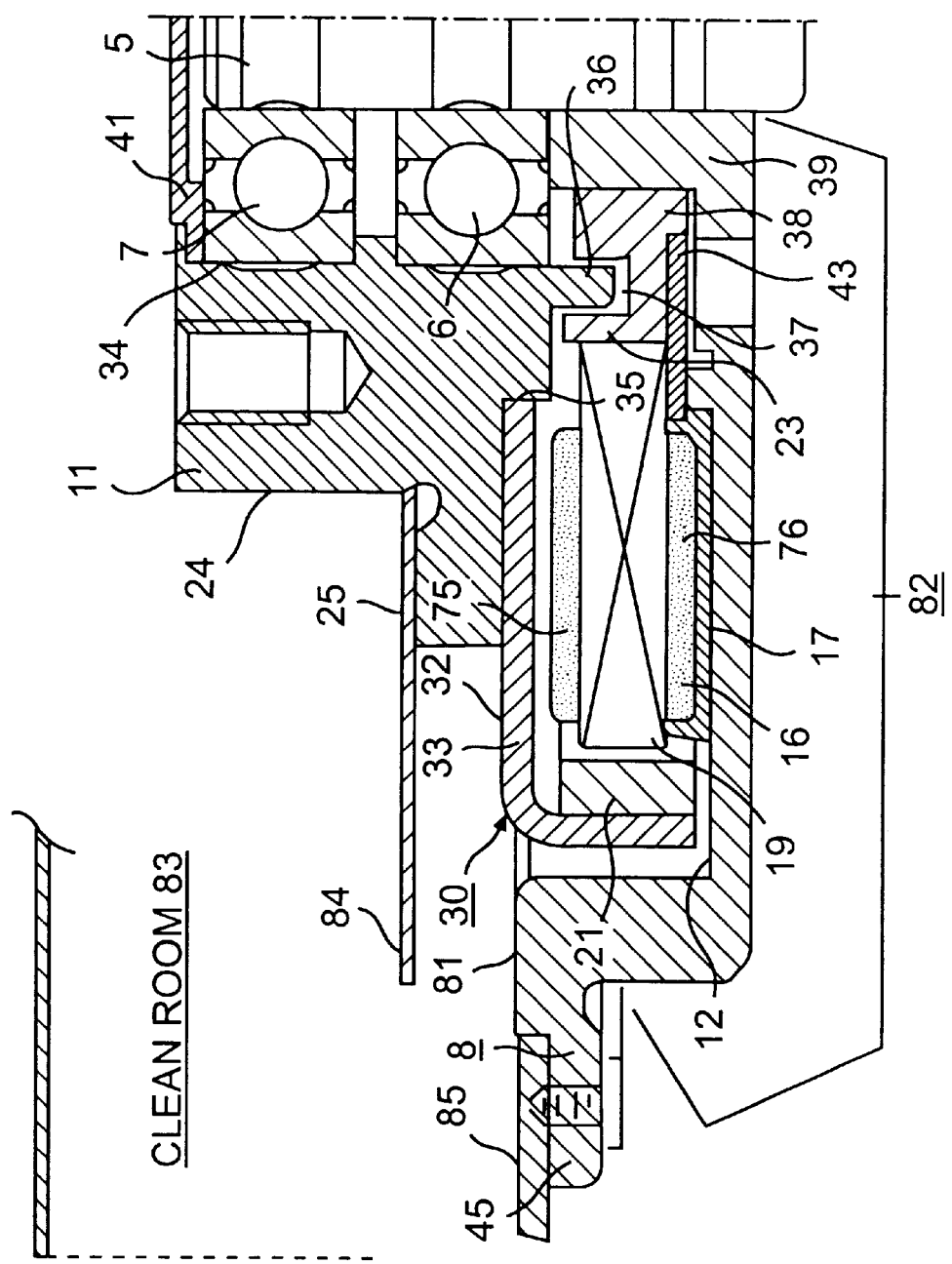

In this manner, one obtains a very compact arrangement with a stationary shaft. A cover disk 41 rotates with the hub 11, in that it is itself the upper axial termination. Thus over the upper axial ball bearing 7, it is bonded to hub 11. Therefore, a flawless seal of the upper ball bearing away from the clean room of the disk chamber is also supplied. Under the lower ball bearing 6 and also within to the space inside of the rotor bell-shape is a labyrinth seal 23, 36, 37, 38 provided, which extends in the stator side of the flange 8. These stator-side labyrinth elements 23, 38, which with the rotor-side ridge-like developable projection 36 grasp or reach into one another are supported on the hub-like extension 39 of the flange or on the flange base. The central stationary shaft 5 is held in the motor flange tank 82 in the extension 39; and the one piece hub 11 extends via at least the ridge-like projection 36 downward into the annular groove formed by the walls of elements 23 and 38 (ridge-like counter elements) of the stator side. The hub 11 serves thus simultaneously to bear at least one disk on its outer cylindrical surface 24 and upon a flat added shoulder 25, just as for the holding of the rotor cups 33 on the shoulder 35 from below, and for the support of the cover disk 41 that rotates with it over the upper bearing 7, and comprises axially below at least one projection 36, which rotating in the stator-side labyrinth seal projections, reaches below the lower ball bearing 6. Between the labyrinth seal and the cover disk 41 lie axially in essentially the two outer races the two ball bearings 6 and 7.

On the hub-like extension 39 in the middle of flange 8, which holds the, for example, press-fit stationary shaft, the inner stator 19 is set over the annular part 23 (including the axial groove) to which it is fastened, for example, by means of glue. This mounting can also be accomplished through the injection of the entire stator block (laminated core grooved winding) together with the flange tank 82. Thereby the outer winding extremities 75, 76 can be overlaid with a casting resin seal, so that one must fear no dirt particles out of the stator winding region 75, 76 in the clean room, because this casting resin is injected in the crucial places well and compactly.

The flange tank 82 has at its extreme outer edge a radial projection or rim 45, through which the motor 30 is fastened in a disk information storage apparatus. In general, this projection 45 will be screwed together with the lower wall 85 of the clean room 83.

The concept of this axial integration of a direct-driving outer rotor motor (with cylindrical air gap) makes possible the full use in the hub of an in-hub-motor of the radially intermediate space between the preferable stationary shaft and the output-bearing cylindrical hub wall for the storage arrangement, which can also occupy the entire available axial space reaching to the adjacent motor region.

The diametral measurement of the cylindrical air gap is not dependent upon the hub diameter. Thereby, the stator also becomes more annular, because the inner stator is, so-to-speak, shifted radially away from the shaft axis. Radially therebetween lie the axial projections from both the rotor and stator sides which are axially annularly interdigitated among one another for rotary motion (which could also be a larger number of ridge-like projections) and also in this near-shaft region lies the cover which covers the bearing space to separate it from the clean room, and well as both arrangements separating the inner motor space from the clean room.

This radially intermediate space between the central shaft and its support and the inner surface of the stator annulus stands available because one does not need a radially wider electromagnetic field with a large air gap diameter for the stator annulus, that is, the laminated stator magnetic stock.

This concept has the advantage that an increased momentum requirement is producible (achievable because the air gap can be kept larger, in any case not dependent upon hub diameter, which must be ruled by the standardization requirements for information storage disks. Since the tendency is toward ever-smaller disks, output drive diameter also tending to be smaller, so that the power requirements for a drive motor placed in the hub is set at pre-existing limits.

Through the above-described concept the radial moment arm of the air gap of an outer rotor motor may be increased as desired, practically at will, through radial enlargement of the flange tank, that is to say of the axially deepened flange configuration. The deepening of the flange configuration in itself permits an axial compactness because the bearings 6, 7 and axial extension 39 are axially, rather than radially aligned.

The iron cup 33 in the motor housing offers at the same time a relatively good magnetic shielding, since it serves at the same time as the magnetic return path, making it essentially thicker than needed for magnetic shielding.

In this way, all of the space between the outer surface of the stationary shaft and the inner wall of the hub for the output system is put to good use.

If the outer hub diameter must become smaller, because of the ever-diminishing diameter of the information storage disks, and therewith also a diminishing size above a minimum size of a central hole must be set, there is virtually no alternative to the one-piece hub 11 as described above, to be made out of low-remanence magnetic material.

On the base 12 on the flange tank, a circuit board 43 with a printed circuit thereon is illustratively supplied, which also can constitute a portion of the connection of the stator-side casting resin seal. The motor thus provided, which boasts a large ratio of air gap diametrical dimension to axial length, is, for example, a brushless outer rotor motor with three strings provided for a three-or-six pulse drive, or for a two- or one-pulse drive provided, such as that described in the following patent documents DE-OS 22 25 442; (Offenlegungschrift) and DE-PS 23 46 380 and/or DE-PS 23 14 259.

We claim:

1. A disk storage device comprising:
    a clean room having a wall;
    at least one disk for storage of information, said at least one disk being in said clean room;
    at least one data head mounted in said clean room for movement in operative relation to said at least one disk within said clean room;
    a shaft and bearing assembly aligned on a central axis;
    a stator carrying a winding arranged substantially coaxially relative to said central axis;
    a rotor coaxial with said central axis and external to and surrounding said stator winding, said rotor being supported by said shaft and bearing assembly for rotation about said central axis; and
    a support member supporting said stator and said shaft and bearing assembly, said support member comprising an axially deepened, tank-form flange joined to said wall of said clean room,
    said rotor having a hub portion of a first material including a disk support shoulder for supporting said at least one disk for storage of information, said rotor further comprising a cup-shaped portion of material different from said first material having a magnet forming a cylindrical air gap with said stator, said cylindrical air gap having a radius, said rotor cup-shaped portion having a radially-extending wall joined to said hub portion, said wall extending radially beyond the radial extremity of said hub portion, and said disk support shoulder of said hub portion having an outer radius from said central axis that is less than the radius of said cylindrical air gap, and wherein said cup-shaped portion extends axially into said axially deepened, tank-form flange.

2. The disk storage device of claim 1, wherein said support member and said cup-shaped portion of said rotor provide an approximation to an outer labyrinth seal; and
    wherein an axially-extending portion of said support member adjacent said shaft and bearing assembly and an inner portion of said lower surface of said hub portion together provide an inner labyrinth seal.

3. The disk storage device of claim 1, wherein the shaft and bearing assembly has a shaft portion extending beyond said stator, and has bearings arranged on said shaft portion, said hub portion of said rotor being supported on said shaft portion.

4. The disk storage device of claim 2, wherein said stator is supported by said support member outside of said inner labyrinth seal.

5. The disk storage device of claim 3, further comprising a cover plate rotatable with said hub portion of said rotor and axially offset from said shaft and contacting said hub portion at an edge of a rotatable portion of one of said bearings.

6. The disk storage device of claim 1, wherein the shaft and bearing assembly includes a stationary shaft portion fixedly mounted in said support member.

7. The disk storage device of claim 1 wherein said cup-shaped portion of said rotor has a flat surface and wherein said hub portion joins said cup-shaped portion at said flat surface.

8. A disk storage device comprising:
    a clean room having a wall;
    at least one disk for storage of information, said at least one disk being in said clean room;

at least one data head mounted in said clean room for movement in operative relation to said at least one disk within said clean room;

a shaft and bearing assembly aligned on a central axis;

a stator carrying a winding arranged substantially coaxially relative to said central axis;

a rotor coaxial with said central axis and external to and surrounding said stator winding, said rotor being supported by said shaft and bearing assembly for rotation about said central axis, said rotor including a hub of a first material and a deep drawn cup-like form of material different from said first material, said cup-like form having a backplane and being fixed to the axial underside of the hub throughout a portion of the backplane, said backplane extending radially beyond the radial extremity of said hub, said hub having an outer surface of non-ferromagnetic material and including a disk support shoulder for supporting said at least one disk for storage of information; and a support member supporting said stator and said shaft and bearing assembly, said support member comprising an axially deepened, tank-form flange, joined to said wall of said clean room, and surrounding said cup-like form.

9. The disk storage device of claim 8 wherein said support member is integrated into said wall of said clean room.

10. The disk storage device of claim 8 wherein said hub is comprised of an aluminum material.

11. The disk storage device of claim 8, wherein said support member and said cup-like form of said rotor provide an approximation to an outer labyrinth seal; and wherein an axially-extending portion of said support member adjacent said shaft and bearing assembly and an inner portion of a lower surface of said hub portion together provide an inner labyrinth seal.

12. The disk storage device of claim 8, wherein the shaft and bearing assembly has a shaft portion extending beyond said stator, and has bearings arranged on said shaft portion, said hub portion of said rotor being supported on said shaft portion.

13. The disk storage device of claim 11, wherein said stator is supported by said support member outside of said inner labyrinth seal.

14. The disk storage device of claim 12, further comprising a cover plate rotatable with said hub portion of said rotor and axially offset from said shaft and contacting said hub portion at an edge of a rotatable portion of one of said bearings.

15. The disk storage device of claim 8, wherein the shaft and bearing assembly includes a stationary shaft portion fixedly mounted in said support member.

16. The disk device of claim 8 wherein said cup-like form of said rotor has a flat surface and wherein said hub portion joins said cup-like form at said flat surface.

* * * * *